Nov. 28, 1961          H. LEFLON          3,010,168
FASTENERS FOR CONVEYOR BELTS AND THE LIKE
Filed June 30, 1959
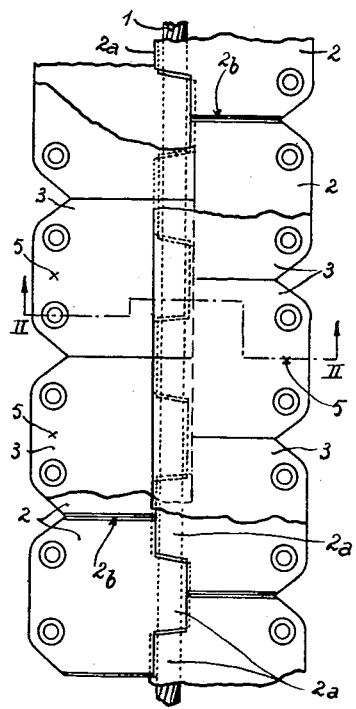
Fig.1
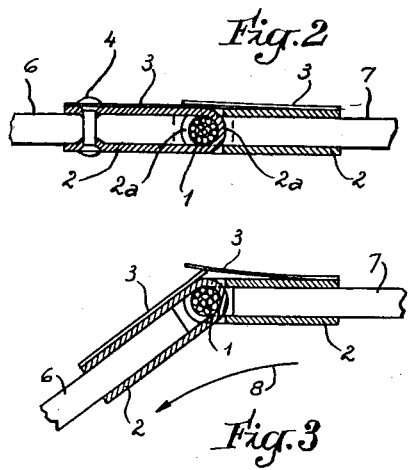
Fig.2
Fig.3
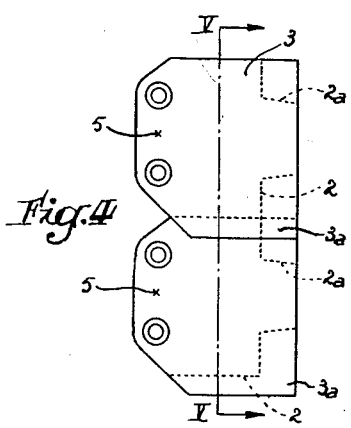
Fig.4
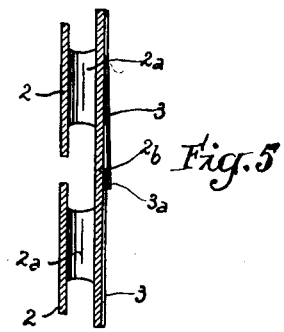
Fig.5
INVENTOR.
Henry Leflon

United States Patent Office 3,010,168
Patented Nov. 28, 1961

3,010,168
FASTENERS FOR CONVEYOR BELTS
AND THE LIKE
Henry Leflon, 85 Rue Vauban, Lyon, France
Filed June 30, 1959, Ser. No. 823,992
Claims priority, application France July 15, 1958
8 Claims. (Cl. 24—33)

This invention relates to fasteners for conveyor belts and it more particularly concerns fasteners of the hinge type formed of two U-shaped members adapted to be disposed on the ends of the belt, with the folded portion of the said members cut at spaced intervals to interengage each other to receive a hinge pin.

Such fasteners are quite satisfactory in use apart from the fact that they are not tight against pulverulent substances conveyed by the belt, as for instance coal or ore. The powder or dust which flows through the fastener generally falls on the idle or return run of the belt and it is carried toward the shafts, bearings, gears and like supporting and/or driving mechanisms of the conveyor, thus interfering with proper operation of the latter.

It has been proposed to avoid this inconvenience by means of so-called "dust-tight" fasteners, wherein the cutting and mounting clearances are reduced to a minimum. But as the fastener wears in use the small initial clearances increase progressively and the fastener rapidly becomes permeable to pulverulent material. It has also been proposed to extend the upper side of each one of the U-shaped members of the fastener above the hinge pin in the portions of the member which do not surround the said pin, and this arrangement has proved satisfactory with some kinds of pulverulent substances, but it has been ineffective with very fine dust-like materials. It has further been proposed to cover the upper side of the fastener, i.e. the upper side of both U-shaped members with a fabric, rubberized fabric or the like, but such a covering is too rapidly torn or otherwise damaged by the material carried by the conveyor.

The present invention has for its object to provide a dust-tight hinge fastener, the tightness of which will not be impaired by wear.

Another object of this invention is to provide a dust-tight fastener which will comprise no covering part liable to be damaged under normal operating conditions.

A further object of this invention is to provide a dust-tight hinge fastener wherein the covering will not impair the transverse flexibility of the fastener.

In accordance with the present invention in a hinge fastener for conveyor belts and the like comprising two U-shaped fastener members hinged to each other, one at least of the said members is provided with a succession of resilient covering plates which extend from the upper side of the said member to engage the upper side of the other one of the fastener members and to cover the spaces through which dust may pass between both members. The said covering plates are preferably made of a material having a high mechanical strength, as for instance spring steel or stainless steel. They may be secured to their supporting U-shaped fastener member by means of the rivets or screws which clamp the said member on the corresponding belt end, but they are conveniently also spot-welded onto the upper side of the said member substantially along the edge thereof farthest from the hinge pin in order to form a single unit therewith before the fastener is mounted on the belt ends. When the covering plates are disposed on only one of the fastener members, the arrangement is preferably such that the said plates are carried by the fastener member which is trailing with respect to the direction of displacement of the belt, the protruding portions of the plates engaging the upper side of the leading fastener member. This disposition prevents ingress of material under the plates at the outlet end of the conveyor.

But it is also possible to provide covering plates on both members, the plates of one member partly covering the plates of the other member. In this case in order to avoid ingress of material under the plates the first member, i.e. the member which carries the plates which cover those of the other or second member, should be trailing with respect to the normal direction of movement of the belt.

In order to avoid any possibility of passage of very fine material between the successive plates carried by the same fastener member, the longitudinal edges of the plates may be disposed in lateral overlapping relation.

It will be observed that the resilient covering plates do not impair the transverse flexibility of the fastener, as for instance when each member of the latter is made of a flexible succession of elements which are connected with each other by frangible portions on one side only of the fastener. In such a case there is conveniently provided one covering plate for each element and the plates are preferably disposed on the side which comprises the said frangible connecting portions.

In the annexed drawings:

FIG. 1 is a fragmental plan view of a dust-tight hinge fastener according to this invention, the covering plates being partly broken away to permit of illustrating the members of the fastener.

FIG. 2 is a section taken along line 11—11 of FIG. 1, showing the fastener attached to two belt ends.

FIG. 3 reproduces FIG. 2 with the fastener at the rear end of the operative run of the conveyor belt, where the rivet of FIG. 2 is omitted and where the fastener members are in angular relationship because of the passage about an end pulley.

FIG. 4 is a fragmental plan view of one of the U-shaped members of a hinge fastener according to another embodiment of the present invention.

FIG. 5 is a section thereof taken along line V—V of FIG. 4.

Referring to FIGS. 1 and 2 the hinge fastener illustrated comprises in the conventional manner two U-shaped members adapted to be clamped on the ends 6 and 7 of a conveyor belt, the curved or folded portion of each member being cut at regular intervals along the length of the member (i.e. transversely with respect to the belt) to permit interengagement of both members to receive a length of steel cable which forms the hinge pin 1 of the fastener. To provide the required transverse flexibility of the fastener, each member is formed of a succession of elements 2 which are connected with each other by frangible portions along one of the sides of the member (upper side in FIG. 1), while being separated from each other by narrow intermediate spaces generally perpendicular to the hinge axis of the fastener along the other side of the member (lower side in FIG. 1). In the embodiment illustrated each element 2 only comprises one central portion 2a which surrounds the hingle pin 1, but it is to be understood that any other arrangement may be used, as this is well known in the art.

According to the present invention each element 2 has on its upper side a covering plate 3, as for instance made of resilient stainless steel, the said plate being secured to the corresponding element along the transverse edge of the said upper side (i.e. along the edge parallel to the hinge axis) and extending longitudinally substantially beyond the hinge axis or, more exactly, beyond a plane A—A (FIG. 2) passing through the said axis and perpendicular to the upper side of the element under consideration. Owing to this arrangement the covering plates 3 of one of the fastener members must extend over those of the other one, as clearly shown in FIG. 2.

Plates 3 are secured on to the respective elements 2 of each fastener member by means of the rivets which clamp the said member on the ends of the conveyor belt. Such a rivet has been indicated at 4 in FIG. 2 and it will be appreciated that the head of this rivet 4 clamps the left-hand plate 3 on the upper side of the corresponding element 2 of the fastener, while leaving the edge of the said plate nearest to the hinge pin free to be raised resiliently.

In order that the plates 3 may already be retained on the fastener elements 2 before the latter are disposed on the belt ends, each plate 3 is also directly fixed to the corresponding element 2 by spot welding along the edge of the plate farthest from the hinge pin, as for instance at 5 in FIG. 1. With such an arrangement each U-shaped member of the fastener forms a single unit with the covering plates 3 of its successive elements.

It will be appreciated that plates 3 form on the fastener a deformable covering, somewhat like the scales of a fish. This covering wholly prevents the material carried by the conveyor belt from passing through the unavoidable clearances existing between both members of the fastener in the vicinity of the hinge pin. As illustrated in FIG. 3 the covering plates 3 hinder in no way the respective angular displacement of the fastener members on the pulleys which support the belt, the free edges of the plates 3 of one member raising slightly the free edges of the plates 3 of the other member. Moreover if the covering plates 3 of the trailing fastener member have been disposed on those of the leading member, any ingress of material between the plates is prevented at the outlet end of the belt, the front edge of the trailing plates 3 projecting above the rear edge of the leading plates, as clearly shown in FIG. 3 in which arrow 8 indicates the running direction of the belt.

In the modification of FIGS. 4 and 5 each covering plate 3 corresponding to an element 2 extends laterally beyond the said element and over the plate which corresponds to the next one, as indicated at 3a. This overlapping arrangement of the covering plates which correspond to the successive elements of each member of the fastener prevents the very fine pulverulent material from passing between the said successive elements when their frangible connecting portions have become ruptured. In FIGS. 1 and 5 reference numeral 2b designates a groove provided between the successive elements 2 to create a line of lesser mechanical strength or in other words a frangible connection. Under the effect of the repeated transverse bending of the fastener the metal breaks more or less rapidly along the said lines 2b and the elements 2 which initially formed a unitary U-shaped fastener member, then become separate from each other. It will be appreciated that with the arrangement of FIGS. 4 and 5 these lines or grooves 2b are covered by the overlapping extensions 3a and that therefore the material is prevented from filtering through the narrow slits which appear after rupture of the metal along the said lines or grooves.

When the overlapping arrangement of FIGS. 4 and 5 is not essential, the successive covering plates 3 which correspond to each U-shaped fastener member may be realized in the form of a continuous strip with grooves or depressions adapted to register with the grooves 2b of the fastener member itself. The metal of this strip breaks along the said grooves and therefore the strip becomes divided into a number of successive individual plates, each corresponding to an element of the fastener member under consideration.

I claim:

1. A hinge fastener for conveyor belts and the like comprising two U-shaped members adapted to be respectively clamped on the belt ends to be connected with each other, the bent portion of each of said members being cut at spaced intervals to permit mutual interengagement of said members; a hinge pin passed through the interengaged bent portions of said members to pivotally connect same with each other; and resilient covering plates disposed on one side of one at least of said members and fixed thereto substantially along the edge of said side farthest from said hinge pin, said covering plates extending beyond said hinge pin and resiliently engaging the corresponding side of the other one of said members so as to remain in contact therewith in spite of smaller angular and longitudinal relative movements of said members in the conveying portion of the belt.

2. In a hinge fastener as claimed in claim 1, the successive resilient covering plates carried by one at least of said fastener members being in lateral overlapping relation so as to remain in mutual resilient contact notwithstanding transverse deflections of the fastener.

3. A hinge fastener for conveyor belts and the like comprising two U-shaped members adapted to be respectively clamped on the belt ends to be connected with each other, the bent portion of each of said members being cut at spaced intervals to permit mutual interengagement of said members, and each of said members comprising a succession of U-shaped elements spaced from each other on a first side of each said member and connected with each other by frangible portions on a second side thereof; a hinge pin passed through the interengaged bent portions of said members to pivotally connect same with each other; and resilient covering plates disposed on said second side of one at least of said members, each fixed to one of the elements thereof substantially along the edge of said element farthest from said hinge pin, and each extending substantially beyond a plane containing the axis of said hinge pin and perpendicular to said second side to resiliently engage the second side of the other one of said members and to remain in contact therewith in spite of smaller angular and longitudinal relative movements of said members in the conveying portion of the belt.

4. In a hinge fastener as claimed in claim 3, the resilient covering plates carried by the successive elements of one at least of said fastener members being in lateral overlapping relation so as to remain in mutual resilient contact notwithstanding transverse deflections of the fastener.

5. In a U-shaped hinge fastener member formed of successive elements spaced from each other on a first side of said member and connected with each other on a second side thereof by frangible portions, resilient covering plates disposed on said second side, each secured to one of said elements substantially along the edge thereof farthest from the bent portion of said member, each extending substantially beyond the bent portion of said member, and the covering plates carried by the successive elements of said member being in lateral overlapping relation so as to remain in mutual resilient contact notwithstanding transverse deflections of said member.

6. A hinge fastener for conveyor belts and the like comprising a first and a second U-shaped members adapted to be respectively clamped on the belt ends to be connected with each other, the bent portion of each of said members being cut at spaced intervals to permit mutual interengagement of said members; a hinge pin passed through the interengaged bent portions of said first and second members to pivotally connect same with each other; resilient covering plates disposed on one side of said first member and secured thereto substantially along the edge of said side farthest from said hinge pin, said covering plates extending beyond said hinge pin to resiliently engage the corresponding side of said second member; resilient covering plates disposed on said corresponding side of said second member and secured thereto substantially along the edge of said corresponding side farthest from said hinge pin, said resilient covering plates of said second member extending beyond said hinge pin and resiliently engaging the outer side of the resilient covering plates of said first member so as to remain in contact therewith in spite of smaller angular and longitudinal relative movements of said first and second members in the conveying portion of the belt.

7. A hinge fastener for conveyor belts and the like comprising two U-shaped members adapted to be respectively disposed on the belt ends to be connected with each other, the bent portion of each of said members being cut at spaced intervals to permit mutual interengagement of said members, and said U-shaped members having aligned holes in the vicinity of the edge thereof farthest from said bent portion; securing means passed through said aligned holes of said U-shaped members to clamp same on the belt ends; a hinge pin passed through the interengaged bent portions of said members to pivotally connect same with each other; and resilient covering plates disposed on one side of one at least of said members and extending substantially beyond said hinge pin to resiliently engage the corresponding side of the other one of said members so as to remain in contact therewith in spite of smaller angular and longitudinal relative movements of said members in the conveying portions of said belt, said covering plates having holes registering with the holes of said U-shaped members to be clamped on said members by the securing means which clamp said members on the belt ends.

8. A hinge fastener for conveyor belts and the like comprising a first and a second U-shaped members adapted to be respectively clamped on the belt ends to be connected with each other, the bent portion of each of said members being cut at spaced intervals to permit mutual interengagement of said members, and each of said members comprising a succession of U-shaped elements spaced from each other on a first side of each said member and connected with each other by frangible portions on a second side thereof; a hinge pin passed through the interengaged bent portions of said members to pivotally connect same with each other; resilient covering plates disposed on said second side of said first member and secured thereto substantially along the edge of said second side of said first member farthest from said hinge pin, said covering plates extending beyond said hinge pin; and resilient covering plates disposed on the second side of said second member and secured thereto substantially along the edge of said second side of said second member farthest from said hinge pin, said resilient covering plates of said second member extending beyond said hinge pin and resiliently engaging the outer side of the resilient covering plates of said first member so as to remain in contact therewith in spite of smaller angular and longitudinal relative movements of said first and second members in the conveying portion of said belt.

References Cited in the file of this patent

UNITED STATES PATENTS

| 2,047,461 | Doyle | July 14, 1936 |
| 2,145,455 | Olsen | Jan. 31, 1939 |

FOREIGN PATENTS

| 14,617 | Great Britain | 1887 |
| 603,291 | Germany | Sept. 26, 1934 |
| 699,473 | France | Dec. 9, 1930 |
| 765,241 | Great Britain | Jan. 9, 1957 |